Sept. 20, 1966   A. WINKLER ET AL   3,273,480
BUILT-IN FLASH STRUCTURE FOR PHOTOGRAPHIC CAMERAS
Filed Nov. 24, 1964   4 Sheets-Sheet 1
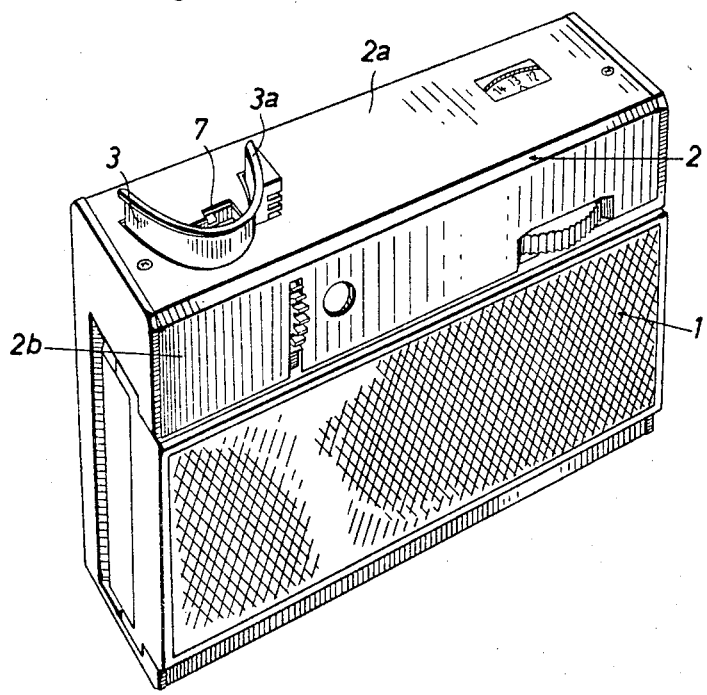
INVENTOR.
ALFRED WINKLER
BY   DIETER ENGELSMANN
FRANZ LANDBRECHT
Michael J. Striker

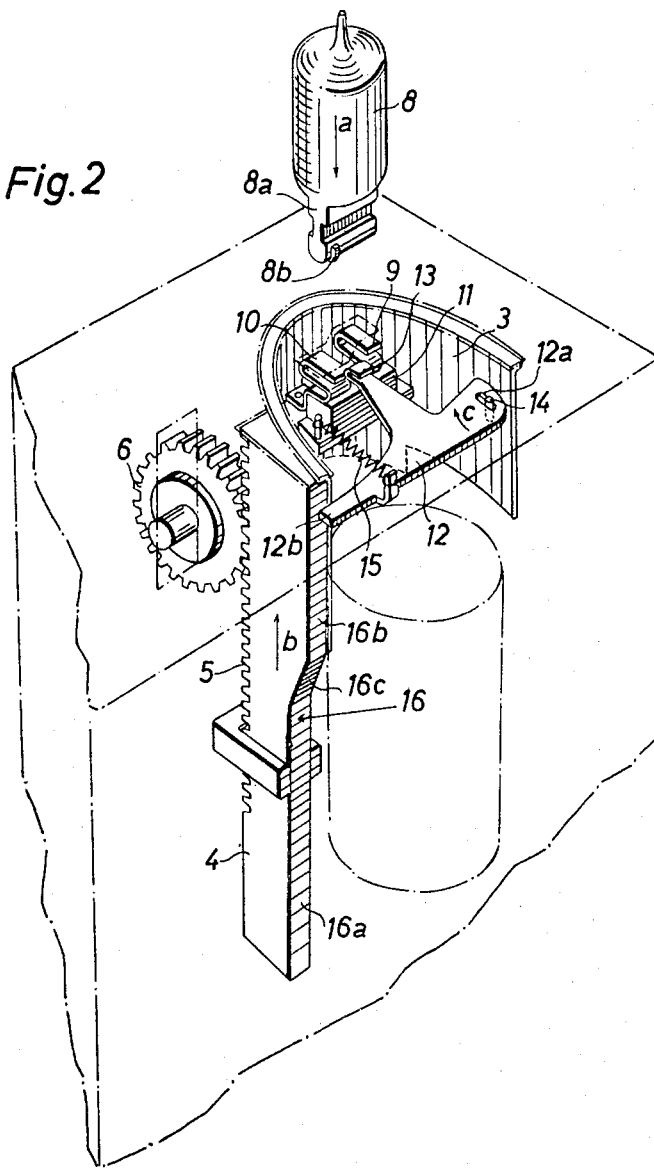

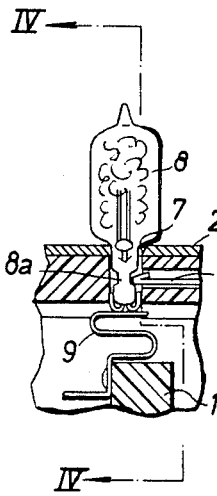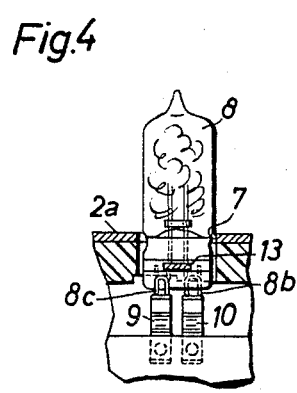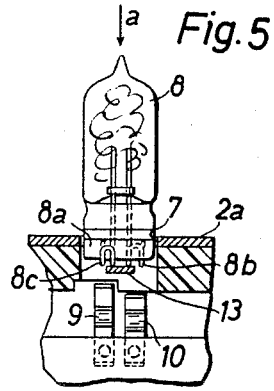

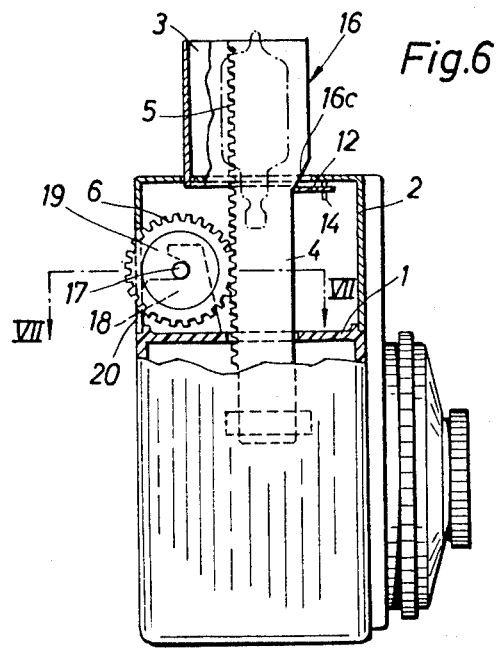
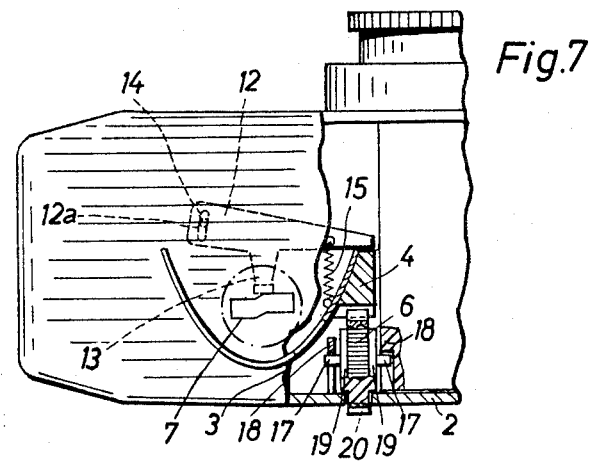

United States Patent Office 3,273,480
Patented Sept. 20, 1966

3,273,480
BUILT-IN FLASH STRUCTURE FOR PHOTO-
GRAPHIC CAMERAS
Alfred Winkler, Munich, and Franz Landbrecht and
Dieter Engelsmann, Unterhaching, Munich, Germany,
assignors to Agfa Aktiengesellschaft, Leverkusen Germany
Filed Nov. 24, 1964, Ser. No. 413,522
Claims priority, application Germany, Nov. 29, 1963,
A 44,672; Apr. 18, 1964, A 21,608
8 Claims. (Cl. 95—11)

The present invention relates to cameras.

More particularly, the present invention relates to built-in flash apparatus for cameras, particularly of the type where the camera has a fixed lamp socket and a movable reflector capable of moving from an inoperative rest position located for the most part within the interior of the camera housing outwardly of the latter to an operative position projecting from the camera housing so that the reflector can cooperate with a lamp carried by the socket to reflect the light thereof when the lamp is ignited.

It is a primary object of the present invention to provide a structure of the above general type which is an exceedingly simple relatively inexpensive construction capable of being easily manufactured and at the same time operating very reliably.

In particular, it is an object of the present invention to provide a structure of the above type which will reliably avoid ignition of flash lamps at improper moments.

Furthermore, it is an object of the present invention to provide a structure of the above type which will reliably prevent ignition of a flash lamp unless the reflector is in its outer operative position, so that if a lamp should be placed in the socket before the reflector has been displaced to its outer operative position the lamp cannot be ignited.

Furthermore, it is an object of the present invention to provide in particular for a structure which is manually actuated to displace the reflector between its operative and inoperative positions elements which need not be manufactured with very precise tolerances but which at the same time cooperate with each other very reliably to produce the desired results.

Furthermore, it is an object of the present invention to provide for a structure of the above type an exceedingly simple assembly of the various components of at least part of the structure.

With the above objects in view, the invention includes, in a camera, a housing means and a lamp socket means carried by the housing means for receiving a lamp socket. A reflector means is carried by the housing means and is supported thereby for movement between an inner rest position where the reflector means is located at least for the most part within the housing means and an outer operative position where the reflector means projects outwardly beyond the housing means to cooperate with the lamp for reflecting the light thereof when the lamp which is supported by the socket means is ignited. In accordance with the present invention there is provided a spring-pressed means which cooperates on the one hand with a lamp for releasably holding the latter within the socket means and on the other hand with a cam means carried by the reflector means for releasably retaining the reflector means in its operative position. In order to displace the reflector means between its positions the camera housing means carries a rotary drive means, and fixed to the reflector means is a driven means which operatively engages the rotary drive means to be driven thereby. The camera housing means has an outer wall formed with an opening through which part of the rotary drive means is accessible to the operator so that the operator can turn the rotary drive means for the purpose of displacing the reflector means between its positions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a perspective illustration of a camera provided with the flash structure of the invention, the camera being shown as it appears from the rear;

FIG. 2 is a perspective front view of the structure of the present invention with the camera itself being indicated fragmentarily in dot-dash lines;

FIG. 3 is a sectional elevation illustrating the manner in which a lamp is received in a socket means of the invention;

FIG. 4 is a transverse fragmentary sectional elevation of the structure of FIG. 3 taken along line IV—IV of FIG. 3 in the direction of the arrows;

FIG. 5 illustrates the manner in which the lamp is inserted into the socket means of the invention, FIG. 5 showing the parts just before they reach the position shown in FIG. 4;

FIG. 6 is a fragmentary side elevation illustrating the structure of the invention which displaces the reflector means between its rest and operative positions; and FIG. 7 is a fragmentary partly sectional plan view taken along line VII—VII of FIG. 6 in the direction of the arrows.

Referring to FIG. 1, there is illustrated therein a camera housing 1 which has an upper hollow portion 2 as is well known in the art, this hollow portion 2 resting on a top wall of the camera housing and forming with the top wall thereof a compartment for various components such as the viewfinder and the like.

As may be seen from FIGS. 1 and 2, the structure of the invention includes an elongated reflector means 3 which is in the form of an elongated channel of parabolic cross section, the camera housing means 1, 2 providing suitable unillustrated guides which support and guide the reflector means 3 for straight line movement in an up and down direction when the camera is held in an upright operative position. When the camera is not used and is simply to be transported from one location to another, the reflector means 3 is in its inoperative, rest position where at least for the most part the reflector means 3 is situated in the housing means 1, 2. Actually in the specific example shown in FIGS. 1 and 2 the reflector means 3 is provided at its upper edge with a flange 3a which directly engages the upper surface of the housing part 2, this upper surface 2a being indicated in FIG. 1, so that during transporting of the camera the flange 3a at the upper end of the reflector means 3 is situated directly at the upper surface 2a of the camera housing means.

The reflector means fixedly carries a structure which on the one hand forms a driven member of a transmission and which on the other hand forms a cam means. This structure is in the form, in the illustrated example, of an elongated bar 4 which is situated at one side of and fixedly connected with the reflector means 3 and which extends through suitable stationary guides of the housing means 1, 2 so as to be guided thereby for straight line movement in an up and down direction longitudinally of the elongated bar 4. The part of the bar 4 which forms the driven member is in the illustrated example formed with teeth 5, so that in this way the bar 4 has an elongated tooth edge portion 5 forming a rack, and this tooth portion of the driven member 4 meshes with a rotary drive means which in the illustrated example takes the form of a rotary gear 6. The rear wall 2b of the upper part 2 of the camera housing means is formed with a vertically extending opening or cutout 20 (FIGS. 6 and 7) through which the gear 6, which forms the rotary drive member of the invention, is accessible to the operator, so that the operator by manually turning the gear 6 can displace the driven member 4 upwardly and downwardly so as to determine the elevation of the reflector means 3.

The part of the upper wall 2a of the housing means which is situated within the reflector means 3 is formed with an opening 7 through which the base of a lamp 8 can be freely displaced, and below this opening 7 the camera housing means fixedly carries a lamp socket means for receiving the base of a flash lamp 8. Thus, one of the further features of the invention is to provide beneath the opening 7 a pair of springy contacts 9, 10 which have a special construction, as shown most clearly in FIG. 5. Thus, referring to FIG. 5, it will be seen that the springy contact 9 extends to an elevation higher than the springy contact 10 before the contact 9 is deflected by lamp 8, so that the contact 9 is closer to the lamp along the path of movement of the latter into the socket means. As a result if the lamp should simply be inserted through the opening 7 to rest on the contacts 9 and 10, the lamp will only be supported by the contact 9 and will not engage the contact 10, so that accidental ignition of the lamp can be avoided.

As is apparent from FIG. 3, the contacts 9 and 10 are of a substantially S-shaped configuration so that these springy contacts can be deflected by the lamp while still having a sufficient spring force to guarantee proper contact with the electrical conductors of the lamp 8.

Inasmuch as the opening 7 is greater than the base 8a of the lamp 8, the base of the lamp can be very easily moved through the opening 7. During the introduction of the lamp through the opening 7 into the socket means, the contact wires 8b, 8c of the flash lamp 8 cannot both simultaneously engage and remain in engagement with the contacts 9 and 10 because the contact 9 when it does not engage a lamp has the position shown in FIG. 5 so that while the conductor 8c of the lamp 8 might possibly engage the contact 9, the conductor 8b cannot engage the contact 10 until the operator depresses the lamp further into the socket in opposition to the force of the spring 9, so that the parts will assume approximately the position shown in FIG. 4.

A spring-pressed lever means 12 (FIG. 2) is provided for releasably holding the lamp 8 in the lamp socket means, and this lever means 12 is in the form of a lever supported for movement in a suitable opening of the housing means, as indicated diagrammatically in FIG. 3. The lever 12 has an arm 13 cooperating with the lamp to hold the latter in the socket means. The lever 12 is formed with an elongated opening 12a at one end thereof, and a stationary pin 14 which is fixedly carried by the camera housing means extends into the opening 12a so as to cooperate therewith to guide the lever 12 for turning movement. A spring 15 is connected at one end to the fixed support 11 for the contacts 9 and 10 and at its opposite end to the lever 12 so as to urge the latter to turn about the pin 14 in the direction of the arrow c shown in FIG. 2.

As was indicated above, the elongated bar 4 also forms a cam means, and this structure is formed by the forward elongated edge portion of the bar 4 where this bar 4 has a pair of elongated parallel camming edge portions 16a and 16b which extend in the direction of movement of the reflector 3 and which are displaced one with respect to the other in a direction transverse to the direction of movement of the reflector 3. These elongated parallel camming portions 16a and 16b are interconnected by an inclined camming portion 16c which forms a continuation of the camming portions 16a and 16b.

The lever 12 has an arm 12b which is pressed against the cam means 16 by the spring 15. As long as the arm 12b engages the upper camming portion 16b of the cam means 16, the holding arm 13 of the lever means 12 is located beyond the range of the lamp socket which is formed in the housing means by the opening 7 and the structure therebeneath. On the other hand, if the arm 12b of the lever means 12 engages the camming portion 16a, then the rearwardly extending arm 13 of the lever means 12 extends into the socket means and can, as shown in FIG. 3, project into a groove in the base 8a of the lamp 8, this groove being formed by a portion of the base of the lamp which is of a lesser thickness than the adjoining portions thereof so that in this way the lamp base is formed with an elongated transverse groove at each of its sides, and with the above-described structure when the lever 12 engages, with its arm 12b, the camming portion 16a, it is possible for the free end of the arm 13 of the lever 12 to snap into one of these grooves at the base of the lamp, and thus the lever means 12 will releasably hold the lamp in the socket means in opposition to the force of the springs 9 and 10.

In order to make an exposure using the flash apparatus of the invention, the operator first turns the rotary drive means 6 so as to displace the reflector means 3 in the direction of the arrow b shown in FIG. 2, and in this way the reflector means 3 is initially moved from its lower inoperative position to its upper operative position. Shortly before the reflector means 3 reaches its upper operative position, the arm 12b of the lever means 12 engages first the inclined portion 16c of the cam means and then remains at the lower end of this inclined portion 16c so as to maintain the reflector means 3 in its operative position. Then the lamp 8 is introduced in the direction of the arrow a shown in FIG. 5, and while the base of the lamp will momentarily engage the free end of the arm 13 to displace this arm 13 momentarily toward the front of the camera, nevertheless it will be noted that because of the elongated configuration of the opening 12a which receives the pin 14 the arm 12b will remain in engagement with the reflector while the end of the lever where the opening 12a is located will be momentarily displaced along the pin 14 during introduction of the lamp, so that the spring 15 will maintain the arm 12b permanently in engagement with the bottom end of the inclined camming portion 16c during introduction of a lamp into the socket.

Of course, as soon as the free end of the arm 13 snaps into the groove at the base of the lamp, as described above, the lamp will be maintained in the socket means of the invention in engagement with the contacts 9 and 10, and of course the pressure with which the spring urges the arm 13 into the groove of the base of the lamp is sufficient to reliably hold the lamp in the socket means in opposition to the force of the springy contacts 9 and 10.

After an exposure has been made, a lamp 8 should be ejected, and for this purpose the operator need only turn the gear 6 so as to displace the reflector 3 downwardly through a very short distance, and the result will be that the inclined camming edge 16c will engage the arm 12b to displace the lever 12 in a direction opposite to that indicated by the arrow c, so that in this way the arm 13 will be displaced out of the groove at the bottom of the lamp. As a result the springy contact 9 will be free to expand and will thus eject a lamp out of the socket, whereupon the operator can return the reflector either to its operative or inoperative position depending upon whether or not another exposure is to be made with flash illumination.

Of course, it is to be noted that while a reflector which moves along a straight path and is connected to an elongated bar 4 with straight camming portions has been described above, and in fact this construction is preferred because of its simplicity, nevertheless the invention is equally capable of being practiced with an angularly movable reflector capable of being turned by the operator between operative and inoperative positions, and with such a construction the gear 6 would of course cooperate with another gear or gear sector and this latter gear or gear sector would be connected with a camming structure which in this case would extend along a circular path so as to cooperate properly with the lever 12.

Also, instead of a gear 6 meshing with teeth 5, it is possible to provide a friction wheel against which an elongated friction surface of the bar 4 presses.

As is shown most clearly in FIGS. 6 and 7, the gear 6, which forms the rotary drive member of the invention, is provided with a pair of coaxial projecting pins 17 at its opposite sides, these pins 17 forming journals which are received in a pair of fixed bearings 18 forming part of and carried by the housing means of the camera. It is apparent particularly from FIG. 6 that each bearing 18 in which a pin 17 is journalled is open at one side, namely, toward the rear of the camera. The rotary drive member 6 is provided inwardly of its outer periphery with a pair of flanges 19 which are of an annular configuration coaxial with the outer periphery of the gear 6, and these flanges 19 engage the inner surface of the rear outer wall of the camera housing portion 2 at the opposite sides of the opening 20 through which the periphery of the gear 6 extends so as to be accessible to the operator. These flanges 19 can simply rest loosely against the inner surface of the rear wall of the upper camera housing part 2. It is preferred to make the gear 6 together with the flanges 19 and the journals 17 of a single body of plastic.

In order to assemble this structure the operator, before assembling the upper hollow housing part 2 with the remainder of the camera housing, places the gear 6 in its operative position with respect to the bearings 8, and then the upper housing part 2 is assembled with the remainder of the camera housing, so that in this way the parts can remain assembled simply by joining of the upper housing part 2 to the remainder of the camera housing. It will be seen from FIG. 6 that with the upper part 2 assembled with the remainder of the camera housing the rear wall of the upper part 2 will cooperate with the bearings 8 to maintain the gear 6 in its illustrated operative position.

It will be noted from FIG. 6 in particular how the lever 12 cooperates with the bottom end of the inclined camming portion 16c for maintaining the reflector means 3 in its upper operative position.

Furthermore, it is to be noted that the spring 15 serves not only to maintain the lever 12 in engagement with the cam means 16, in addition the spring 15 acts together with the lever 12 to form a spring means urging the teeth 5 into engagement with the teeth of the gear 6, and furthermore this spring means urges the flanges 19 against the inner surface of the rear wall of the camera housing part 2, so that these motion transmitting elements which are spring-pressed into engagement with each other need not be made with any particular high degree of accuracy since any lack of accuracy within relatively large tolerances will simply be eliminated by the spring means pressing the motion transmitting parts against each other so that they will operate without play even though they are not precisely manufactured.

It will be understood that each of the elements described above, or two or more together, may also find a useful application in other types of cameras differing from the types described above.

While the invention has been illustrated and described as embodied in flash apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, housing means; socket means carried by said housing means for receiving a flash lamp; reflector means carried by said housing means for movement from an inoperative position situated at least for the most part within said housing to an operative position projecting from said housing for reflecting the light from a flash lamp carried by said socket means, said socket means including a pair of springy contacts one of which is located in the path of lamp movement into said socket means closer to a lamp than the other of said contacts so that said one contact will be engaged first by a lamp introduced into said socket means, at least said one contact being springy and deflected by a lamp during insertion thereof into said socket means until the lamp engages both of said contacts; cam means carried by said reflector means for movement therewith; and spring-pressed lever means carried by said housing means and engaging a lamp in said socket means for releasably retaining said lamp in said socket means, said lever means also engaging said cam means for releasably maintaining said reflector means in said operative position thereof.

2. In a camera, in combination, housing means; socket means carried by said housing means for receiving a flash lamp; reflector means carried by said housing means for movement from an inoperative position situated at least for the most part within said housing to an operative position projecting from said housing for reflecting the light from a flash lamp carried by said socket means; cam means carried by said reflector means for movement therewith; and spring-pressed lever means carried by said housing means and engaging a lamp in said socket means for releasably retaining said lamp in said socket means, said lever means also engaging said cam means for releasably maintaining said reflector means in said operative position thereof, said housing means supporting said reflector means for movement along a straight line between said inoperative and operative positions thereof and said cam means being elongated and extending in the direction of movement of said reflector means, said cam means having a pair of elongated parallel camming portions extending in the direction of movement of said reflector means and displaced one with respect to the other in a direction transverse to the direction of movement of said reflector means, and said camming means having an inclined camming portion extending between and forming a continuation of said parallel camming portions.

3. In a camera, in combination, housing means; socket means carried by said housing means for receiving a flash lamp; reflector means carried by said housing means for movement from an inoperative position situated at least for the most part within said housing to an operative position projecting from said housing for reflecting the light from a flash lamp carried by said socket means; cam means carried by said reflector means for movement therewith; and spring-pressed lever means carried by said housing means and engaging a lamp in said socket means for releasably retaining said lamp in said socket means, said lever means also engaging said cam means for releasably maintaining said reflector means in said operative position thereof, said housing means supporting said reflector means for movement along a straight line between said inoperative and operative positions thereof and said cam means being elongated and extending in the direction of movement of said reflector means, said cam means having a pair of elongated parallel camming portions extending in the direction of movement of said reflector means and displaced one with respect to the other in a direction transverse to the direction of movement of said reflector means, and said camming means having an inclined camming portion extending between and forming a continuation of said parallel camming portions, said lever means being supported by said housing means for turning movement in a plane perpendicular to the direction of movement of said reflector means and cam means therewith.

4. In a camera, in combination, housing means; reflector means carried by said housing means for movement from an inoperative position located at least for the most part within said housing means to an operative position projecting outwardly beyond said housing means; rotary drive means carried by said housing means for rotary movement, said housing means having an outer wall formed with an opening through which said rotary drive means is accessible to the operator so that the operator may manually turn said rotary drive means; driven means operatively engaging said rotary drive means to be driven thereby and connected with said reflector means for displacing the latter in response to movement of said driven means by actuation of said rotary drive means; and spring means urging said driven means into engagement with said drive means.

5. In a camera, in combination, housing means; reflector means carried by said housing means for movement from an inoperative position located at least for the most part within said housing means to an operative position projecting outwardly beyond said housing means; rotary drive means carried by said housing means for rotary movement, said housing means having an outer wall formed with an opening through which said rotary drive means is accessible to the operator so that the operator man manually turn said rotory drive means; driven means operatively engaging said rotary drive means to be driven thereby and connected with said reflector means for displacing the latter in response to movement of said driven means by actuation of said rotary drive means; and spring means urging said driven means into engagement with said drive means, said spring means also cooperating with said driven means for releasably maintaining said reflector means in said operative position thereof.

6. In a camera, in combination, housing means; reflector means carried by said housing means for movement from an inoperative position located at least for the most part within said housing means to an operative position projecting outwardly beyond said housing means; rotary drive means carried by said housing means for rotary movement, said housing means having an outer wall formed with an opening through which said rotary drive means is accessible to the operator so that the operator may manually turn said rotary drive means; and driven means operatively engaging said rotary drive means to be driven thereby and connected with said reflector means for displacing the latter in response to movement of said driven means by actuation of said rotary drive means, said housing means including a pair of bearings open at one side and said rotary drive means having journals situated in said bearings, said wall of said housing cooperating with said rotary drive means for maintaining the latter supported for rotation by said bearings.

7. In a camera, in combination, housing means; reflector means carried by said housing means for movement from an inoperative position located at least for the most part within said housing means to an operative position projecting outwardly beyond said housing means; rotary drive means carried by said housing means for rotary movement, said housing means having an outer wall formed with an opening through which said rotary drive means is accessible to the operator so that the operator may manually turn said rotary drive means; and driven means operatively engaging said rotary drive means to be driven thereby and connected with said reflector means for displacing the latter in response to movement of said driven means by actuation of said rotary drive means, said housing means including a pair of bearings open at one side and said rotary drive means having journals situated in said bearings, said wall of said housing cooperating with said rotary drive means for maintaining the latter supported for rotation by said bearings, said rotary drive means having an outer periphery and a pair of annular flanges located inwardly of and being coaxial with said outer periphery thereof so that said outer periphery of said rotary drive means projects outwardly beyond said flanges, said flanges engaging an inner surface of said outer wall of said housing means at opposite sides of said opening through which said rotary drive means is accessible to the operator.

8. In a camera, in combination, housing means; reflector means carried by said housing means for movement from an inoperative position located at least for the most part within said housing means to an operative position projecting outwardly beyond said housing means; rotary drive means carried by said housing means for rotary movement, said housing means having an outer wall formed with an opening through which said rotary drive means is accessible to the operator so that the operator may manually turn said rotary drive means; driven means operatively engaging said rotary drive means to be driven thereby and connected with said reflector means for displacing the latter in response to movement of said driven means by actuation of said rotary drive means, said housing means including a pair of bearings open at one side and said rotary drive means having journals situated in said bearings, said wall of said housing cooperating with sid rotary drive means for maintaining the latter supported for rotation by said bearings, said rotary drive means having an outer periphery and a pair of annular flanges located inwardly of and being coaxial with said outer periphery thereof so that said outer periphery of said rotary drive means projects outwardly beyond said flanges, said flanges engaging an inner surface of said outer wall of said housing means at opposite sides of said opening through which said rotary drive means is accessible to the operator; and spring means urging said driven means into engagement with said rotary drive means and urging said flanges of said rotary drive means against said inner surface of said outer wall of said housing means.

References Cited by the Examiner

UNITED STATES PATENTS

| | | | |
|---|---|---|---|
| 2,947,854 | 8/1960 | Lozeau | 240—44.1 X |
| 3,113,495 | 12/1963 | Brandt et al. | 95—11.5 |
| 3,184,584 | 5/1965 | Bundschuh | 240—1.3 |
| 3,196,770 | 7/1965 | Lange | 95—11 |

FOREIGN PATENTS 936,220  9/1963  Great Britain.

NORTON ANSHER, *Primary Examiner.*

J. F. PETERS, *Assistant Examiner.*